Dec. 1, 1936.  R. HENRY  2,062,575

FLEXIBLE COUPLING

Filed July 29, 1935

R. HENRY  INVENTOR.

BY Merrill M. Blackburn
ATTORNEY

Patented Dec. 1, 1936

2,062,575

UNITED STATES PATENT OFFICE

2,062,575

FLEXIBLE COUPLING

Raymond Henry, Rock Island, Ill.

Application July 29, 1935, Serial No. 33,703

8 Claims. (Cl. 64—11)

The present invention relates to flexible couplings for such uses as connecting motor shafts to washing machine drive shafts and various other comparable shafts, for example, the pump shaft of an oil burning heater. These uses are cited merely for the purpose of illustrating uses to which this coupling may be put and are not to be construed in a limiting sense.

Among the objects of this invention are to provide a flexible coupling for connecting shafts, which coupling will act, to a certain extent, as a universal in connecting shafts which are not absolutely correctly aligned; to provide a coupling which will take care of a reasonable amount of the torsional twist connected with the sudden starting of electric motors, called upon to start a fixed load; to provide an improved flexible coupling of increasing wear-resisting qualities; and such further objects, advantages, and capabilities as will hereafter appear and as are inherent in the construction disclosed herein. My invention further resides in the combination, construction, and arrangement of parts illustrated in the accompanying drawing and, while I have shown therein what is now considered the preferred embodiment of this invention, I desire the same to be understood as illustrative only and not to be interpreted in a limiting sense.

In the drawing annexed hereto and forming a part hereof,

Figures 1, 2:
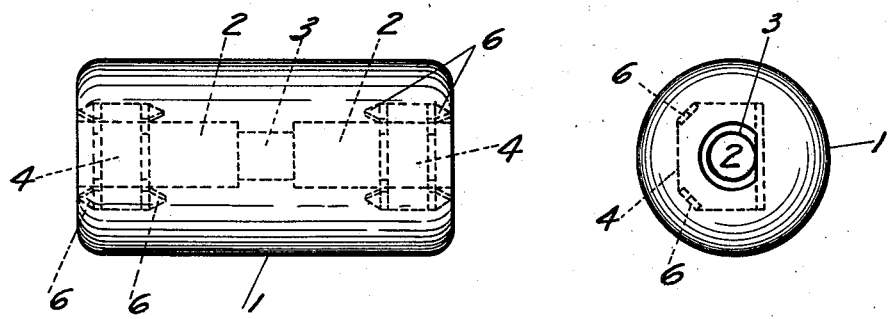
Fig. 1 is a side elevation illustrating my present invention.
Fig. 2 represents an end elevation of the structure shown in Fig. 1.

Reference will now be made in greater detail to the annexed drawing for a more complete disclosure of this invention. This coupling comprises a body 1 of resilient material having longitudinal apertures 2 in the ends thereof, and preferably having an aperture 3 connecting the apertures 2. As shown in Fig. 2, the apertures 2 have one side flattened to fit the flattened end portions of the shafts which are to be connected by this coupling. Preferably, the body 1 is formed from rubber which is moulded to the desired shape and which will stand considerable torsional strains without breaking down and will return to initial or zero position as soon as the strain is released.

Figure 3:
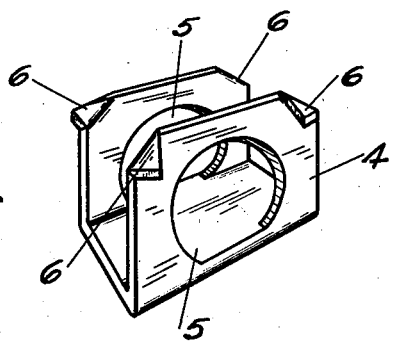
Fig. 3 is a perspective view of an insert placed near each end of the structure shown in Fig. 1, the purpose of which will be more fully disclosed hereinafter.

Within each end of the body 1 is a wear-resisting insert of generally U-shape in cross section. This insert 4 is shown in Fig. 3 as being provided with openings 5 just slightly larger than the shaft which is to be inserted into said openings. The inside of the back of the U is flat and fits against the flat face of the shaft, forming a wear-resisting surface to contact the flat surface of the shaft and take the strains incident to the pull of the motor. As shown at 6, the four corners of the insert are turned outwardly so that the rubber of the body 1 may be forced under these points which will assist in holding the inserts 4 in place within the body. In the manufacture of this construction, the material is placed within the mould and the inserts are put in to approximate position, and then the ends of the mould are pressed against the cylindrical part and force the inserts into proper position. In this position, the outer points 6 contact the inner faces of the ends of the mould and properly space the inserts within the body. The rubber is then vulcanized to a proper degree and a resilient flexible connection is the result.

It will of course be understood that the specific description of structure set forth above may be departed from without departing from the spirit of this invention as set forth herein and in the appended claims.

Having now described my invention, I claim:

1. A flexible coupling of continuous resilient material having apertures in the ends thereof, each aperture having a flat side to fit a correspondingly shaped shaft, said coupling having embedded in its end portions inserts of wear-resisting material.

2. A flexible coupling comprising a continuous elongated body of resilient material provided approximately centrally in each of its ends with apertures for the reception of shafts to be connected in driving relation, each aperture having a side portion thereof flattened to fit a correspondingly shaped portion of the inserted shaft, each end portion of the coupling having a hard insert therein having an opening therethrough for the reception of the inserted shaft, said opening having a flat side lying in substantially the same plane as the flat side of the opening in the body.

3. A flexible coupling for shafts, comprising a unitary tubular body of soft rubber having brass inserts mounted in the end portions of the body, said inserts having openings therethrough in axial alignment with the opening through the body, the openings in the body and inserts having one side flattened to fit a correspondingly shaped shaft inserted into each of said openings.

4. A structure as defined by claim 3 in which the inserts are made from sheet metal bent into a U-shape in cross section, the hole through each insert passing through the two arms thereof, the flattened portion of the opening through the insert being coincident with the inside surface of the back of the U.

5. A flexible coupling, comprising an approximately cylindrical body of soft rubber provided in each end with a substantially axial opening, one side of which is flat, and metallic inserts embedded in the end portions of said body, said inserts having a substantially flat face approximately coincident with the flat face of the corresponding opening in the body.

6. A structure as defined by claim 5 in which the corners of the inserts are turned outwardly at a substantial angle to the adjacent faces of the inserts.

7. A flexible coupling of resilient material having apertures in its ends, said apertures being non-circular in cross section, and said coupling having, embedded in the material thereof between the middle and end, an insert of a wear-resisting material.

8. A coupling for coupling the ends of two shafts, comprising a body of yielding material having longitudinal openings in the end portions thereof, the openings being non-circular in cross section to fit the ends of said shafts, and a relatively hard material within the body to resist wear and stretching by the shafts.

RAYMOND HENRY.